United States Patent [19]

Yokono

[11] Patent Number: 5,524,178
[45] Date of Patent: *Jun. 4, 1996

[54] NEURAL NETWORK LEARNING SYSTEM

[75] Inventor: Masayuki Yokono, Kawasaki, Japan

[73] Assignee: Fujitsu Limited, Kawasaki, Japan

[*] Notice: The term of this patent shall not extend beyond the expiration date of Pat. No. 5,295,227.

[21] Appl. No.: 206,146

[22] Filed: Mar. 7, 1994

Related U.S. Application Data

[63] Continuation of Ser. No. 911,067, Jul. 9, 1992, Pat. No. 5,295,227.

[30] Foreign Application Priority Data

Jul. 9, 1991 [JP] Japan .................................. 3-167901

[51] Int. Cl.$^6$ .................................................. G06F 15/18
[52] U.S. Cl. .............................. 395/23; 395/11; 395/22; 395/900
[58] Field of Search .................... 395/20–25, 27, 395/900, 11; 382/153–159; 364/807

[56] References Cited

U.S. PATENT DOCUMENTS 5,179,596  1/1993  Weingard .................... 395/25
5,295,227  3/1994  Yokono ....................... 395/11
5,311,601  5/1994  Carpenter et al. ........... 395/23

OTHER PUBLICATIONS

Nagata et al, "Mobile robot control by a structured hierarchical neural nwetwork"; IEEE Control Systems Magazine, Apr. 1990, pp. 69–76.

*Primary Examiner*—David K. Moore
*Assistant Examiner*—Tariq Hafiz
*Attorney, Agent, or Firm*—Staas & Halsey

[57] ABSTRACT

A neural network learning system is applied to extensive use in applications such as pattern and character recognizing operations, various controls, etc. The neural network learning system operates on, for example, a plurality of neural networks each having a different number of intermediate layer units to efficiently perform a learning process at a high speed with a reduced amount of hardware. A neural network system having a plurality of hierarchical neural networks each having an input layer, one or more intermediate layers and output layers is formed from a common input layer shared among two or more neural networks, or the common input layer and one or more intermediate layers and a learning controller for controlling a learning process performed by a plurality of neural networks.

1 Claim, 16 Drawing Sheets

$$\sum_{n=1}^{\text{NUMBER OF NETWORKS}} (\text{NUMBER OF FORWARD PROCESSES IN SERIES} ) (\text{NUMBER OF LEARNING PROCESSES BY NETWORK } n )) \quad \textcircled{1}$$

$$\mathop{\text{MAX}}_{\substack{n=1,\text{NUMBER} \\ \text{OF NETWORKS}}} \{ (\text{NUMBER OF FORWARD PROCESSES IN PARALLEL} ) (\text{NUMBER OF LEARNING PROCESSES BY NETWORK } n ) \} \quad \textcircled{2}$$

$$\mathop{\text{MAX}}_{\substack{n=1,\text{NUMBER} \\ \text{OF NETWORK}}} \{ (\text{NUMBER OF FORWARD PROCESSES BY PRESENT INVENTION} ) (\text{NUMBER OF LEARNING PROCESSES BY NETWORK } n ) \} \quad \textcircled{3}$$

Fig. 13

{TOTAL NUMBER OF FORWARD PROCESSES IN SERIES}

$$\sum_{n=1}^{\text{NUMBER OF NETWORKS}} (\{\text{NUMBER OF LEARNING PROCESSES BY NETWORK } n\}) \quad ④$$

{TOTAL NUMBER OF FORWARD PROCESSES IN PARALLEL}

$$\sum_{n=1}^{\text{NUMBER OF NETWORKS}} (\{\text{NUMBER OF LEARNING PROCESSES BY NETWORK } n\}) \quad ⑤$$

{TOTAL NUMBER OF FORWARD PROCESSES BY PRESENT INVENTION}

$$\underset{n=1, \text{NUMBER OF NETWORKS}}{\text{MAX}} \{\text{NUMBER OF LEARNING PROCESSES BY NETWORK } n\} \quad ⑥$$

Fig. 14

|  | | → TIME | TOTAL NUMBER OF PROCESSES | NUMBER OF PROCESSES |
|---|---|---|---|---|
| SERIAL PROCESS | NETWORK A<br>NETWORK B<br>NETWORK C | ******         COMPLETION<br>         ***      →<br>            ********** | 6+4+11<br>=21 | 6+4+11<br>=21 |
| PARALLEL PROCESS | NETWORK A<br>NETWORK B<br>NETWORK C | ******  COMPLETION<br>****       →<br>********** | 6+4+11<br>=21 | =11 |
| PRESENT INVENTION | NETWORK A<br>NETWORK B<br>NETWORK C | ****++++COMPLETION<br>++++++  →<br>******** | =11 | =11 |

\* : INDICATES FORWARD PROCESS    + : INDICATES INSIGNIFICANT PROCESS ( IDLE STATE )

Fig. 15

| ITEM | SERIAL METHOD (CONVENTIONAL) | PARALLEL METHOD (CONVENTIONAL) | METHOD OF PRESENT INVENTION |
|---|---|---|---|
| TOTAL TIME | Σ (LEARNING TIME IN EACH NETWORK) | MAX (LEARNING TIME IN EACH NETWORK) | MAX (LEARNING TIME IN EACH NETWORK) |
| TOTAL NUMBER OF FORWORD PROCESSES | | REFER TO FIGURE 14 | |
| NUMBER OF FORWORD PROCESSES | | REFER TO FIGURE 13 | |
| NUMBER OF HARDWARE SET FOR PATTERN LOADING | ONE | NUMBER OF NETWORKS | ONE |
| NUMBER OF VARIATIONS TO BE LEARNED SIMULTANEOUSLY | ONE | MORE THAN ONE | ONE |

Fig. 16

NEURAL NETWORK LEARNING SYSTEM

This application is a continuation of application Ser. No. 07/911,067, filed Jul. 9, 1992, now U.S. Pat. No. 5,295,227 dated Mar. 15, 1994.

BACKGROUND OF THE INVENTION

The present invention relates to a learning system through a neural network for efficiently performing at a high speed a learning process, and can be widely used in applications such as pattern recognizing operations, various controls, etc.

In a learning process performed by a neuro-computer, a learning result greatly depends on a learning parameter, an initial weight value, and the number of units in the intermediate layer. Accordingly, a number of trials and errors must be performed on various conditions to obtain a neural net having desired capabilities.

FIG. 1 is a block diagram of an example of the configuration of the learning system through the conventional neural network. It illustrates four networks each having an input layer, an intermediate layer, and an output layer. Each of networks 1–4 simultaneously or sequentially receives a learning pattern to perform its learning process.

Through the conventional neural networks, data can be learned both in parallel and series as shown in FIG. 2. In the serial method (a), data are serially learned in network 1, and then learned in network 2, and so on. By contrast, in the parallel method (b), data are learned simultaneously in parallel in network 1 in process 1, in network 2 in process 2, and so on.

FIG. 3 shows an example of a conventional neural network learning system. It shows an example of a learning system in which data are learned by three neural networks A, B, and C each having a different configuration. A pattern storage unit 10 stores inputted patterns to be learned by each of the networks and the corresponding teaching patterns. The input patterns are stored in an input pattern unit 11, and the teaching patterns in a teaching pattern unit 12.

Each of the neural networks A–C comprises an input layer unit 13, an intermediate layer unit 14, an output layer unit 15, an error calculator 16 for calculating the error between an output from the output layer unit 15 and teaching data outputted from the teaching pattern unit 12 in each neural network, and a learning controller 17 for updating weight values stored in the intermediate layer unit 14 and the output layer unit 15 according to an error value outputted by the error calculator 16.

In FIG. 3, for example, data are learned in series by the neural network A, and then by the neural network B, and so on. During learning, each neural network receives an inputted pattern as a learning pattern from the input pattern unit 11, and learns such that a difference between an output from the output layer unit 15 and teaching data outputted from the teaching pattern unit 12 converges to a value smaller than a predetermined value.

Between two learning methods shown in FIG. 2, the parallel method is more effective in performing a learning process at a high speed. However, the conventional parallel method requires a large amount of hardware because each neural network is operated independently. Besides, it must load a pattern for each network from a pattern storage unit in performing a forward process by a neural network in which its input layer receives a value and obtains an output from a unit in its output layer.

SUMMARY OF THE INVENTION

An object of the present invention is to provide a neural network learning system capable of efficiently performing a learning process at high speed without extensive hardware.

A feature of the present invention resides in a neural network learning system comprising a plurality of hierarchical networks each having input layers, intermediate layers, and output layers, wherein at least one of the input layer and the intermediate layer of the neural network is shared among the neural networks.

BRIEF EXPLANATION OF THE DRAWINGS

FIG. 13 are formulas for how to calculate the number of forward processes;

FIG. 14 are formulas for how to calculate the total number of forward processes;

FIG. 15 is a table providing a comparison of the number of forward processes and the total number of forward processes; and FIG. 16 is a table providing a comparison of the conventional method and the present invention.

DESCRIPTION OF THE PREFERRED EMBODIMENT

Figure 4:
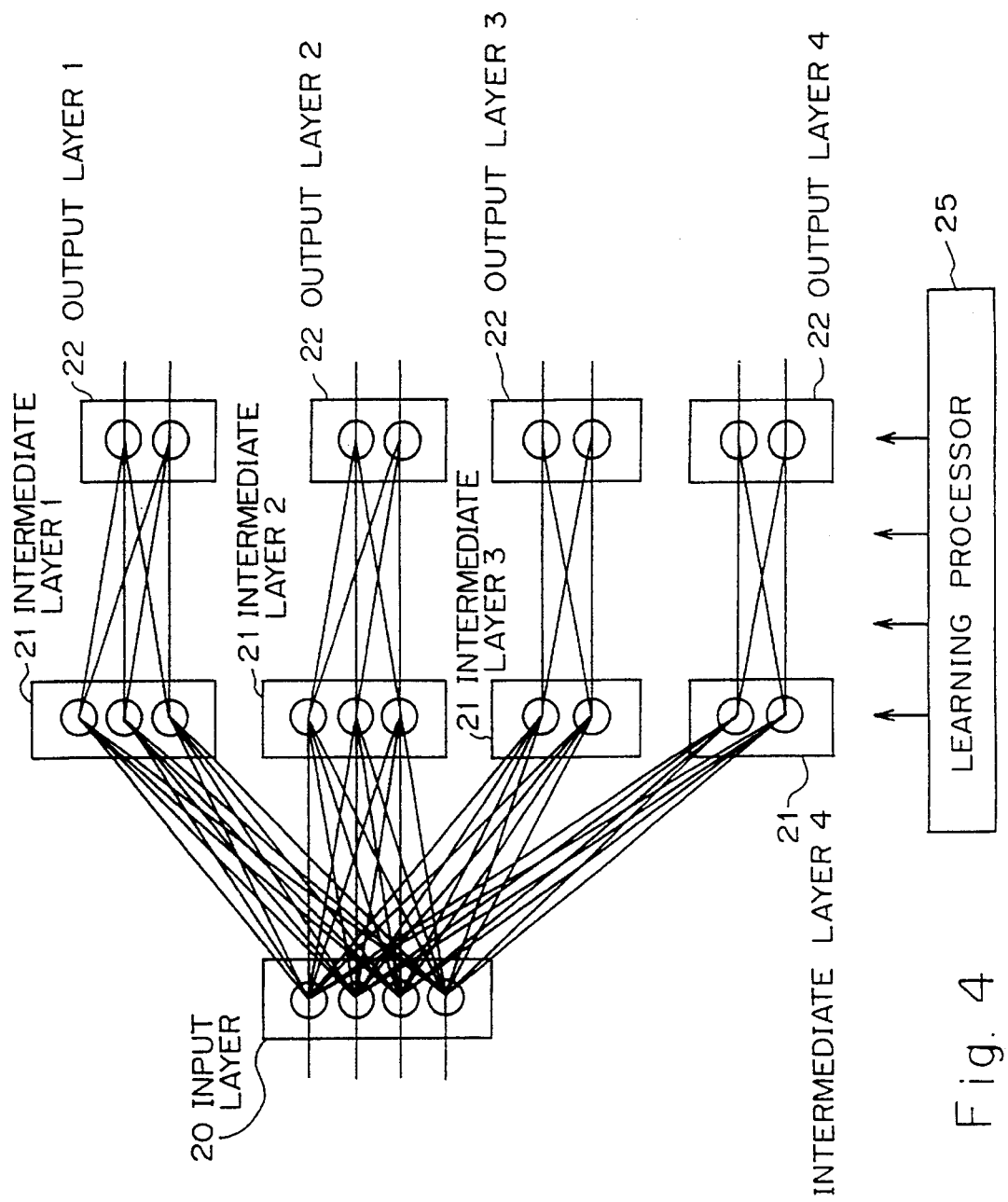
FIG. 4 is a block diagram for explaining the principle of the present invention.

FIG. 4 is a block diagram for explaining the principle of the present invention. It shows a neural network system comprising four neural networks which share only an input layer 20 and a learning controller 25 for controlling a learning process performed by these networks. The number of units differs between intermediates 1 & 2 and intermediates 3 & 4. An initial weight value between the input layer and intermediate layer 1 is different from that between the input layer and intermediate layer 2. Likewise, an initial weight value between the input layer and intermediate layer 3 is different from that between the input layer and intermediate layer 4. FIG. 4 shows four neural networks from among which a neural network capable of converging a learning process is selected as an optimum one.

In FIG. 4, since the input layer 20 is shared among the four networks, a learning process can be efficiently performed by saving an inputting operation when the same pattern is learned by them. That is, a learning pattern is loaded only once to the neural network system, thereby efficiently performing the learning process at a high speed.

Although only the input layer is shared in FIG. 4, intermediate layers 1 and 2 or intermediate layer 3 and 4 can be put together and shared if, for example, the same initial weight value is assigned to them.

Figure 5:
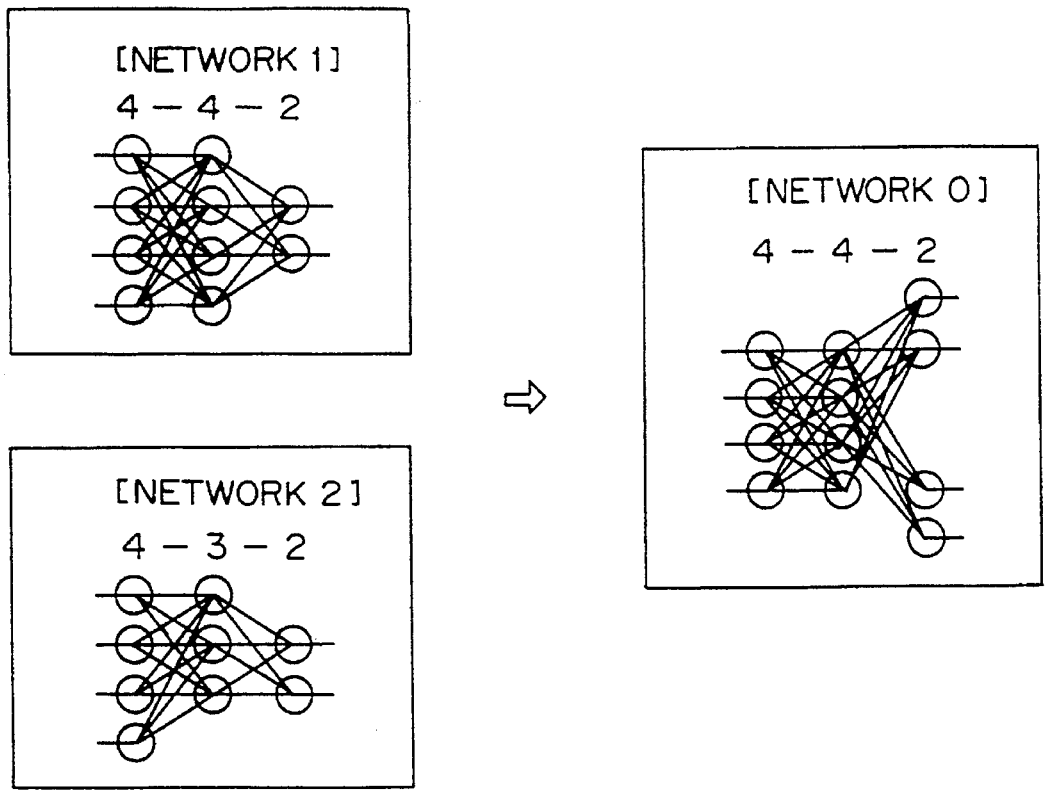
FIG. 5 is a schematic diagram of an embodiment of a system comprising two networks each having a different structure.
Figure 6:
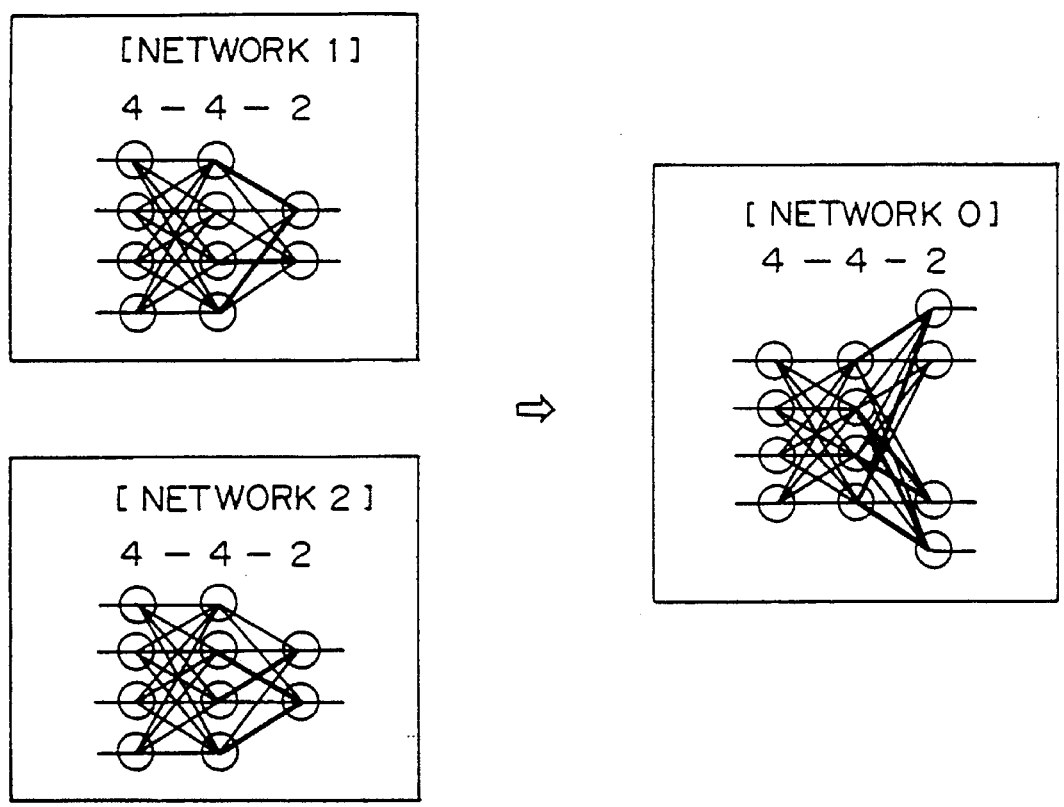
FIG. 6 is a schematic diagram of an embodiment of a system comprising two networks each having a different initial weight value.
Figure 7:
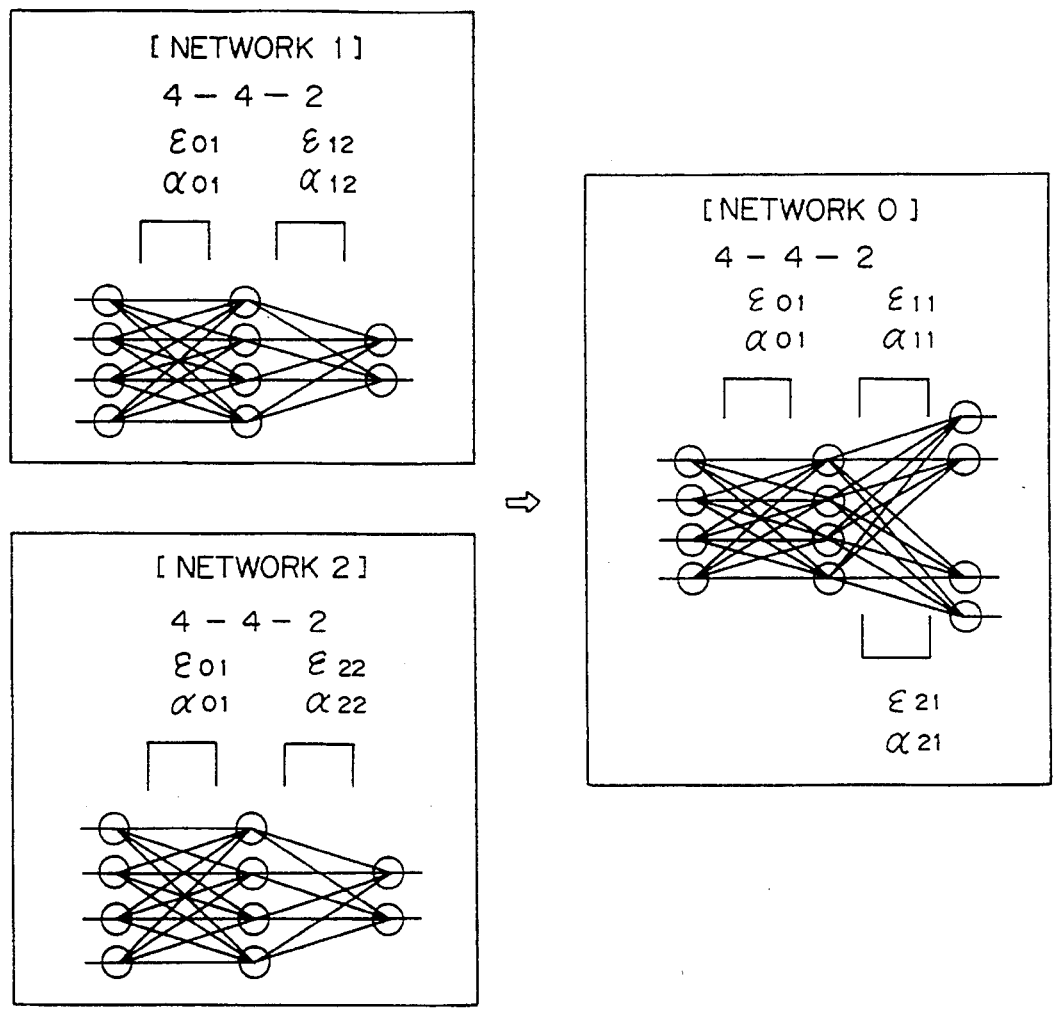
FIG. 7 is a schematic diagram of an embodiment of a system comprising two networks each having a different learning parameter.

FIGS. 5–7 show embodiments of the configuration of the neural network system of the present invention. The present invention is configured as a neural network system in which a plurality of networks each having a different structure, an initial weight value, or a learning parameter share their input layer or input and intermediate layers so that the optimum neural network can be obtained by providing the same pattern to the plurality of networks. FIG. 5 shows an example of a learning system configured by two networks each having a different structure. It shows a learning system using a neural network system having four units in its intermediate layer and sharing its input and intermediate layers. This system is obtained by combining two neural network individually having four and three units in respective intermediate layers.

FIG. 6 shows an example of a learning network system configured by two neural networks each having a different initial weight value. In FIG. 6, the network system is configured by two neural networks each having the same network configuration, that is, the same number of layers and units, but having a different initial weight value between the intermediate layer unit and the output layer unit.

FIG. 7 shows an example of a neural network system configured by two networks each having a different learning parameter and indicating the connection between the intermediate layer and the output layer. The configurations shown in FIGS. 5–7 are only examples, and networks can be optionally combined by freely setting a parameter for a simulation of a neural network system.

Figure 3:
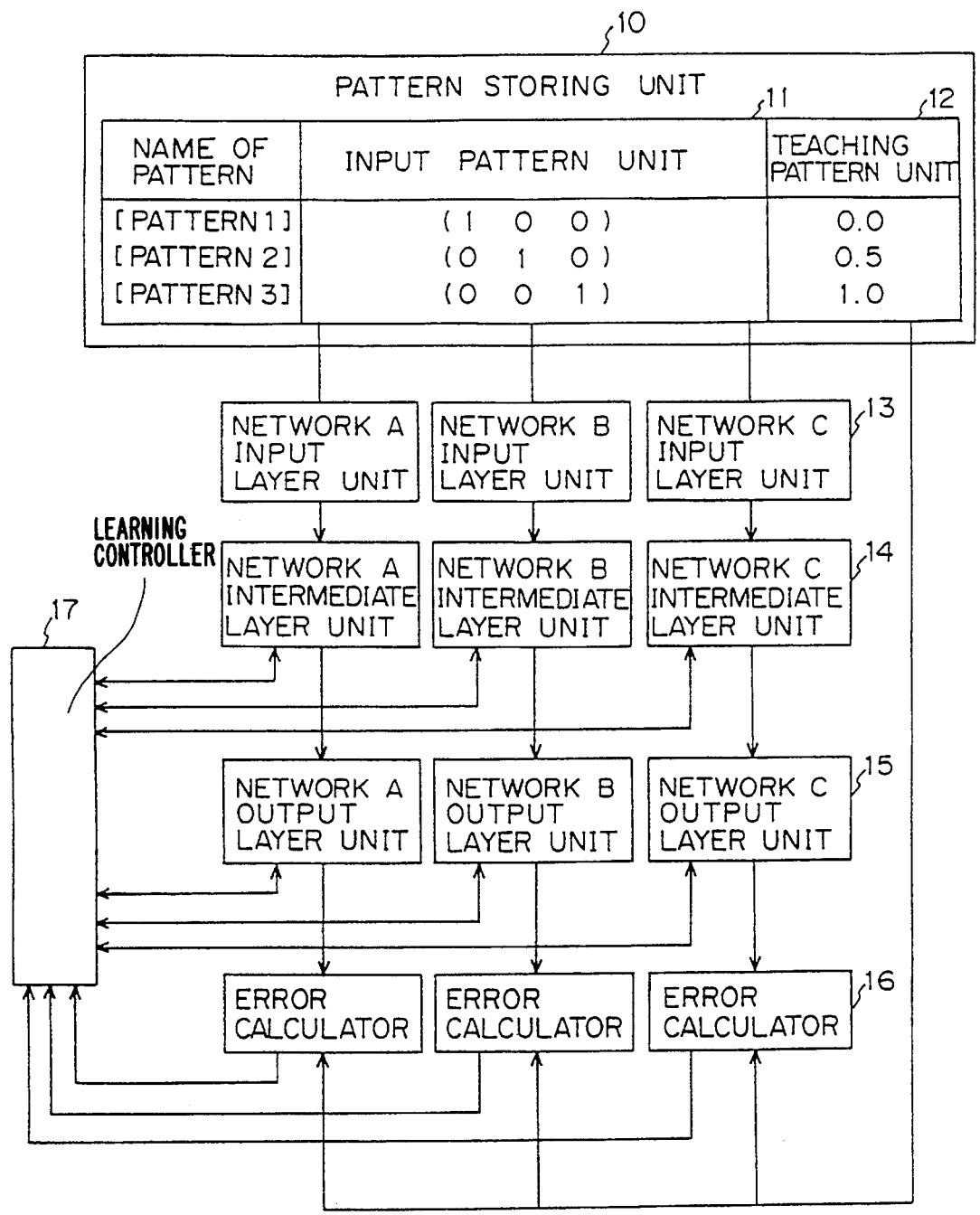
FIG. 3 is a more detailed block diagram of a learning process performed by a conventional neural network.
Figure 8:
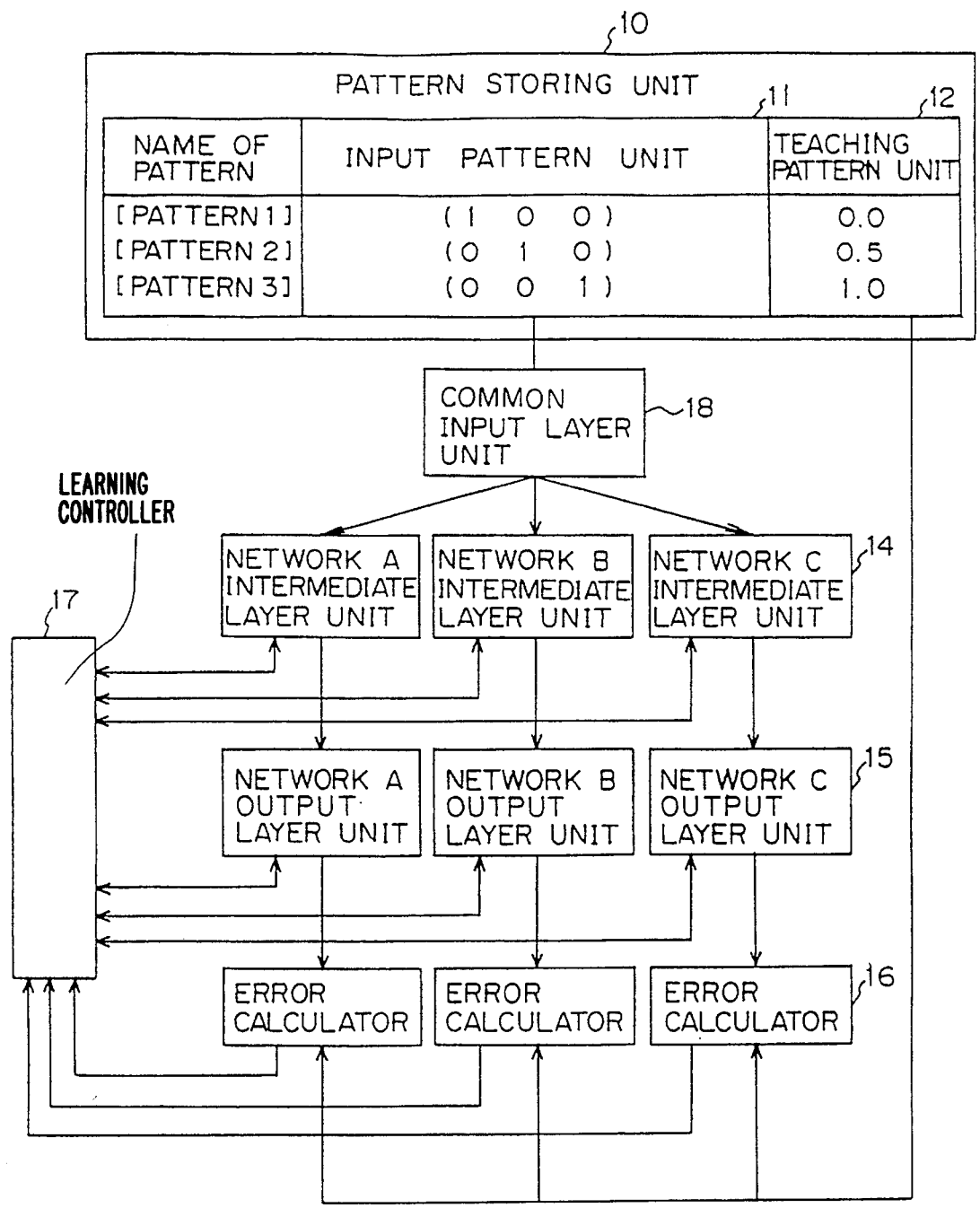
FIG. 8 is a block diagram for explaining an embodiment of the neural network learning system according to the present invention.

FIG. 8 is a block diagram for explaining the embodiment of the neural network learning system of the present invention. It shows an example of a neural network system having a common input layer as shown in FIG. 4. Like in the conventional method shown in FIG. 3, it comprises three networks A–C. However, since it has a common input layer, it is provided with one common input layer unit 18 unlike the configuration shown in FIG. 3, thus featuring the present invention.

Figure 9:
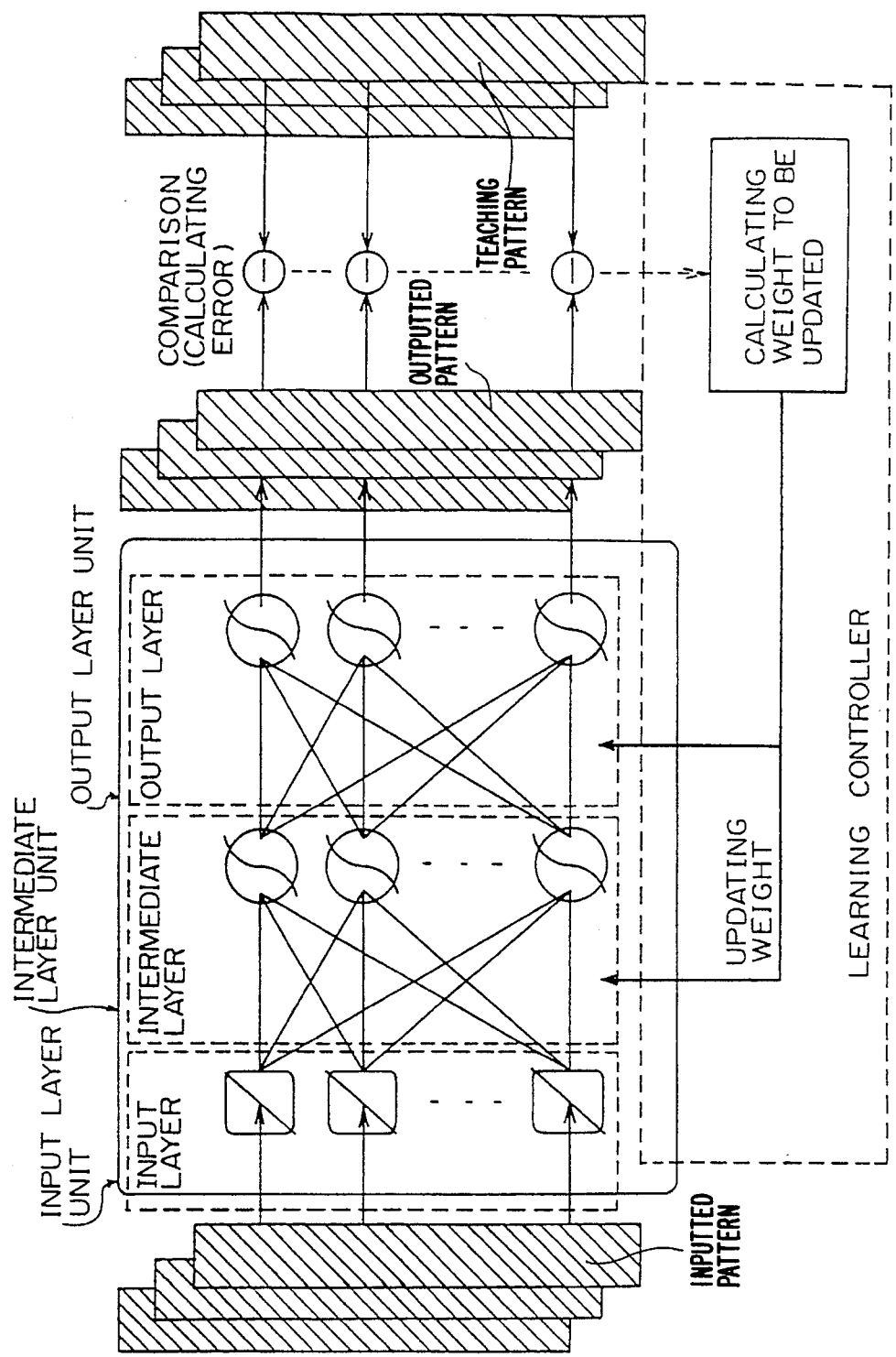
FIG. 9 is a block diagram of the operation of each unit for a single network.

FIG. 9 is an explanatory view in which one neural network is extracted to explain each block shown in FIG. 8. The pattern storage unit 10 shown in FIG. 8 stores a learning pattern to be learned by a neural network. A learning pattern comprises an inputted pattern and a corresponding teaching pattern. These patterns are normally assigned as a vector. Normally, a network learns a plurality of sets of patterns, and they are applied to the common input layer unit 18. The input layer unit is operated as an input layer of a neural network, and that shown in FIG. 8 broadcasts the same pattern data to the three networks A–C.

Since the intermediate layer units and the following units are different in each of the networks A, B, and C, they are explained by referring to FIG. 9. The intermediate layer unit is operated as an intermediate layer of a neural network, and it can be shared by a plurality of neural networks. Likewise, the output layer unit is operated as an output layer of a neural network. The learning controller calculates an update value of the weight of the connection in the network according to the difference between the output pattern from the output layer unit and the teaching pattern, and outputs the update value to the intermediate layer unit and the output layer unit. For example, the intermediate layer stores the weight of the connection between each unit in the input layer and each unit in the intermediate layer, and the weight is updated according to the weight update value outputted by the learning controller. The difference between the output pattern and the teaching pattern is calculated by the error calculator 16 shown in FIG. 8.

In FIG. 8, the learning controller 17 operates in parallel the three networks A, B, and C, and the learning process is performed in parallel by each of these networks. In the learning process, each of the intermediate layer units 14 and output layer units 15 output to the learning controller 17 necessary data for updating weight values, and the learning controller 17 assigns a weight update value to each of the units 14 and 15. The learning process is repeated until the difference between the output pattern outputted by the output layer unit 15 and the teaching pattern converges to a value smaller than a predetermined value.

In FIG. 8, a teaching pattern is provided for each inputted pattern, that is, for the output value assuming that the output layer has only one unit. Normally, the number of units in the output layer is not limited to one. In the present embodiment, a back propagation method is assumed as a neural network learning method. However, it is not important what learning method is adopted, but the present invention is applicable if a teaching pattern as a model pattern is given, that is, if the learning process presents a teaching pattern and the neural network is structured in a hierarchical configuration.

Figure 10:
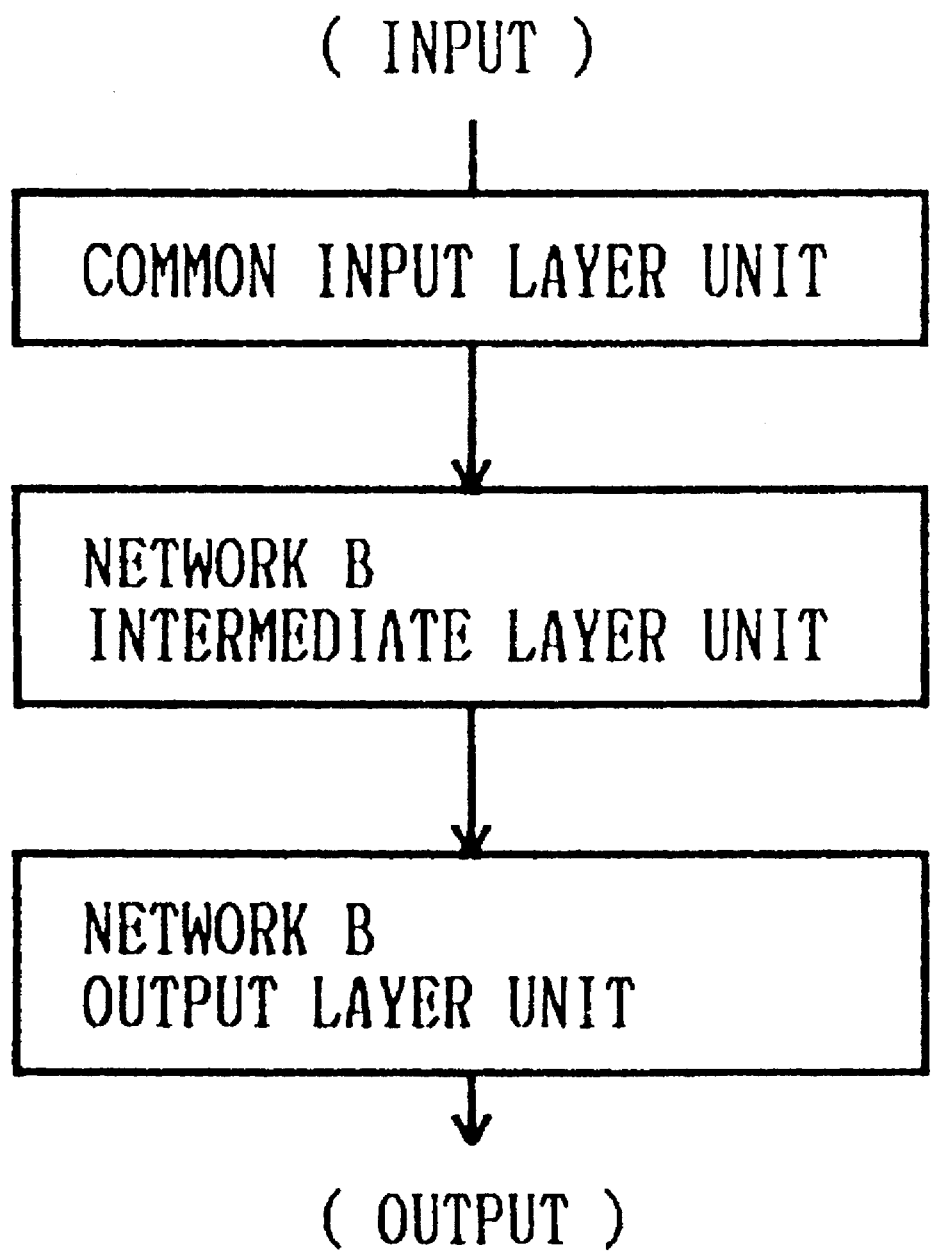
FIG. 10 is a block diagram of an embodiment of a runtime neural network.

FIG. 10 is an explanatory view showing how to use the neural network after performing a learning process by the neural network system. For example, if a learning process is completed by the learning system shown in FIG. 8, the three neural networks A–C are tested using a pattern different from the learning pattern, and the one yielding the most desirable result is selected as a runtime neural network. For example, in FIG. 8, if the test result of network B indicates the best result, networks A and C are not used at runtime. Actually, the neural network process is performed through the common input layer unit, the intermediate layer unit in network B, and the output layer unit in network B.

Figure 11:
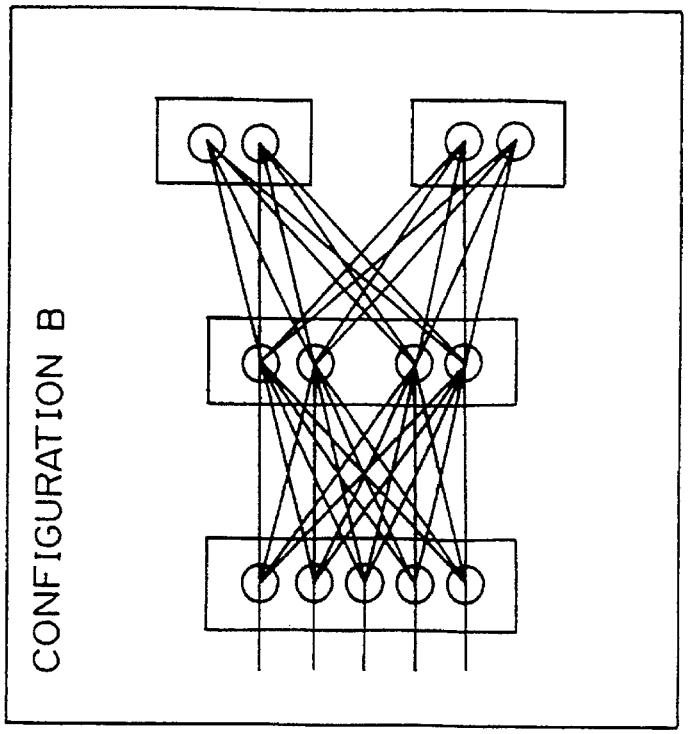
FIG. 11 is a schematic diagram of an embodiment of a neural network learning system in which the intermediate layer is shared.
Figure 11:
Figure 11:
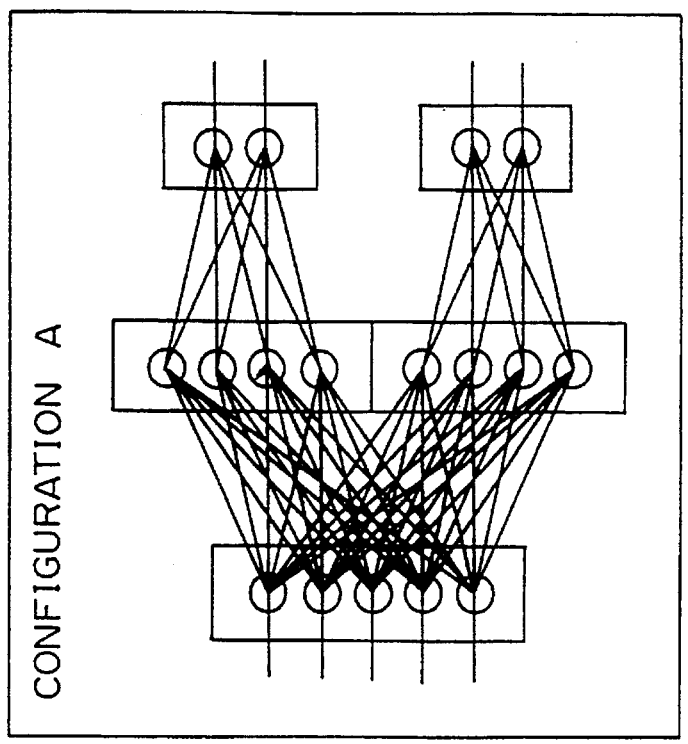

As described above, the present invention enables a common use of an intermediate layer as well an input layer. FIG. 11 shows an example in which an intermediate layer is shared as shown by configuration B when configuration A has the same connection weight between the input layer and both of two intermediate layers. Configuration B allows the connection between the input layer and the intermediate layer to be shared, thereby simplifying the efficient learning process.

Figure 12:
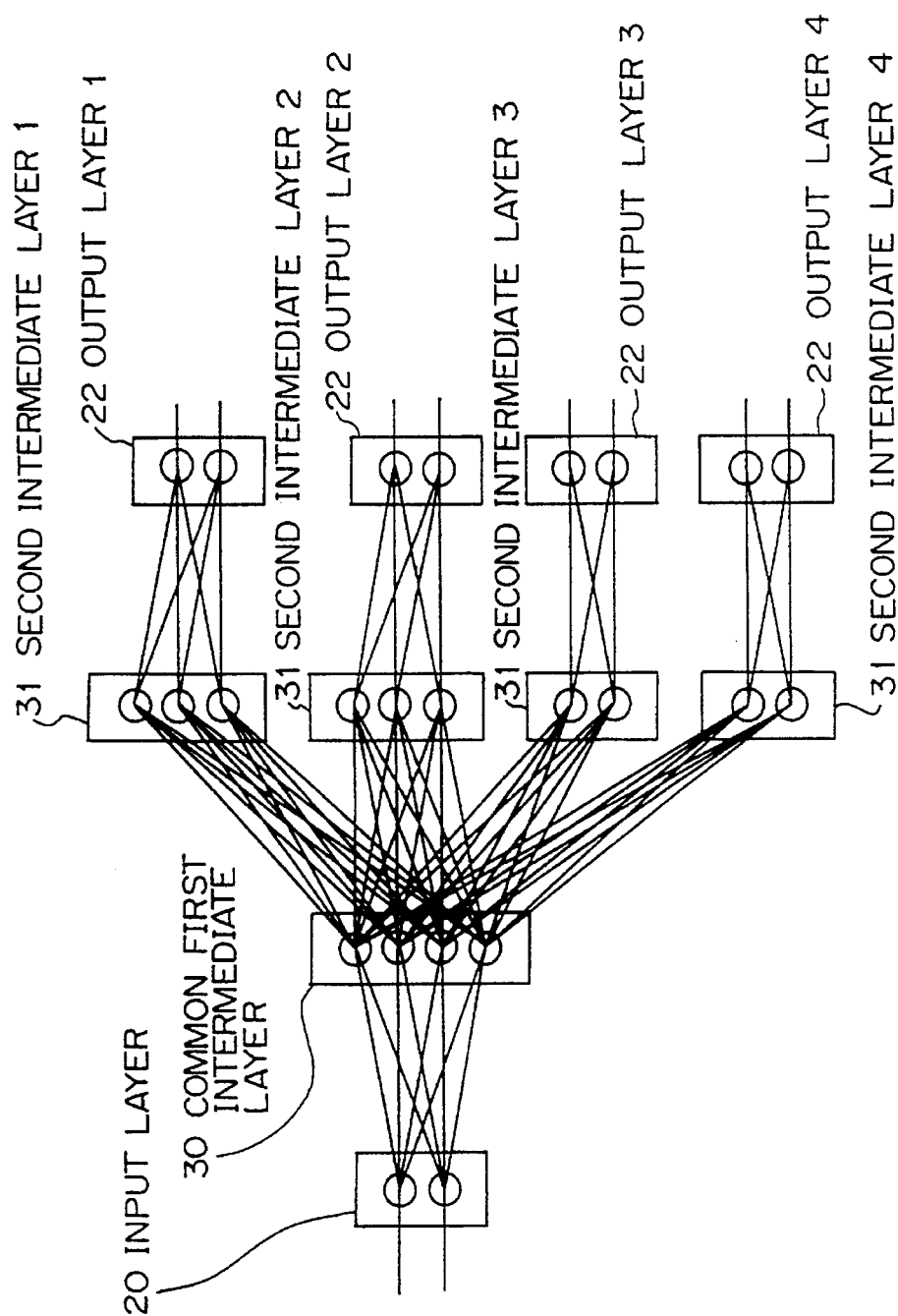
FIG. 12 is a schematic diagram of an embodiment of a neural network learning system in which the input layer and the first intermediate layer are shared.

FIG. 12 shows an example of sharing a part of an intermediate layer when a plurality of intermediate layers are provided. In FIG. 12, the intermediate layer unit comprises the first intermediate layer and the second intermediate layer, and the former is shared.

Figure 1:
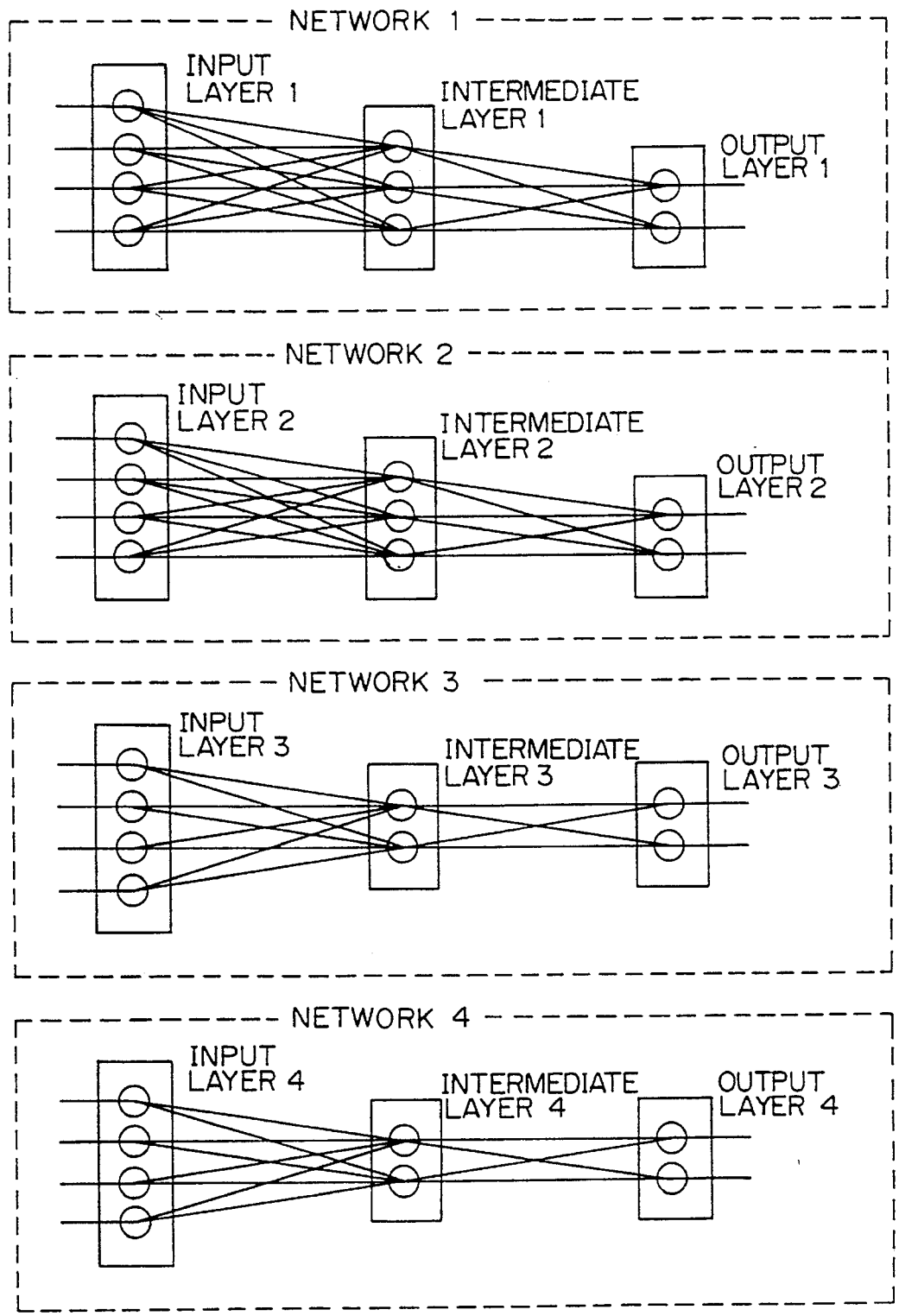
FIG. 1 is a general block diagram of an example of a learning process for a conventional neural network.
Figure 2:
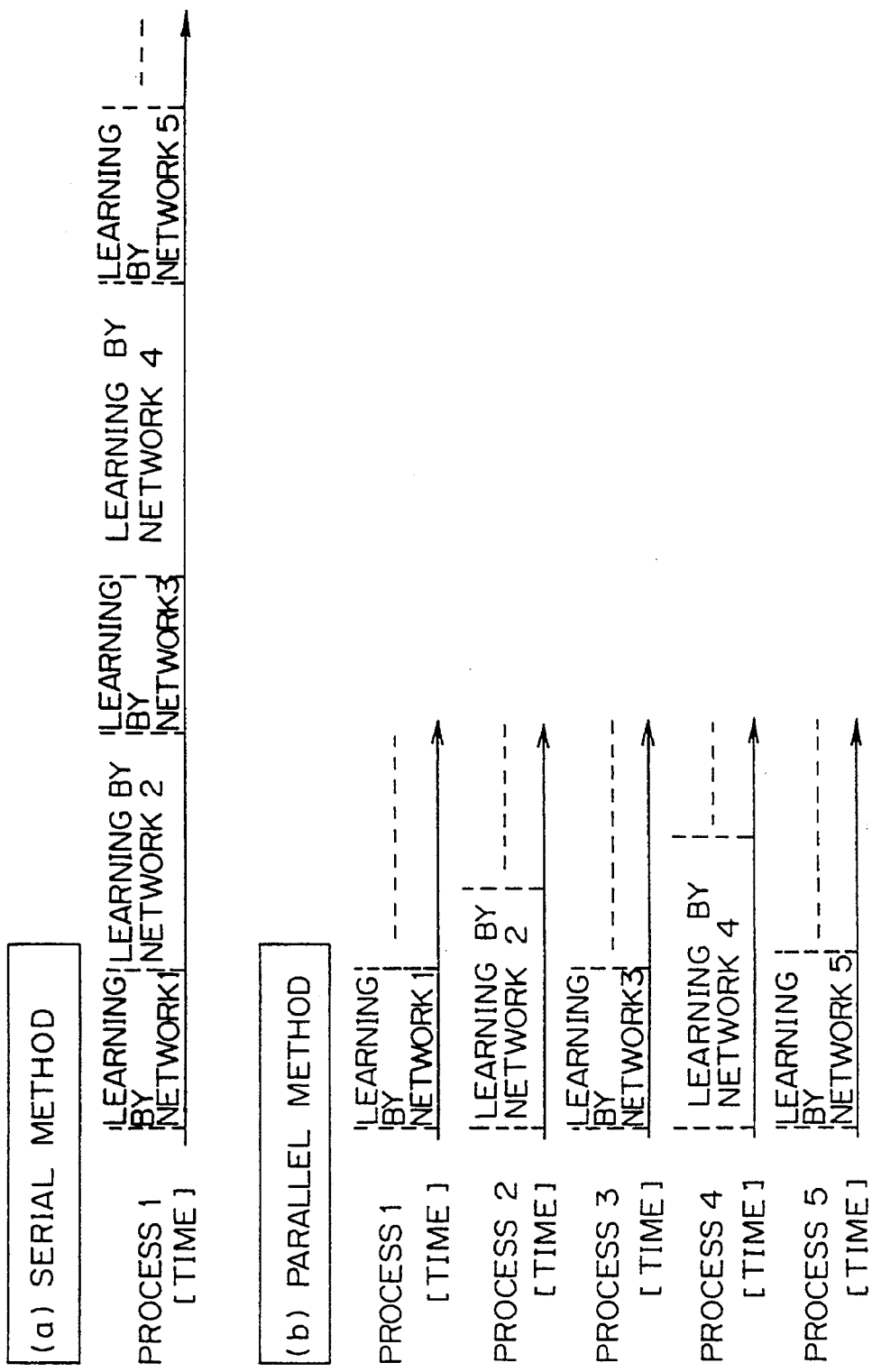
FIG. 2 is a time chart for learning processes of a conventional neural network.

FIG. 13 shows how to calculate the number of forward processes in the conventional serial and parallel methods and the present invention. A forward process means a series of operations starting from applying an input pattern to the input layer of a neural network and ending with obtaining an output from a unit in the output layer. In a parallel method, a plurality of forward processes concurrently performed is counted as one forward process as shown in FIG. 2.

Thus, as shown in FIG. 13, the number of forward processes performed by the serial method equals the sum of learning processes in network n specified by the network number n, while the number of forward processes performed by the parallel method and the present invention equals the maximum value in the numbers of learning processes performed in respective networks 1 through n.

FIG. 14 shows how to calculate the total number of forward processes. The total number of forward processes, for example, is calculated by the following expression in the serial method.

$$\text{the total number of forward processes} = \sum_{n=1}^{\text{NUMBER OF NETWORKS}}$$

(the number of learning processes performed by network n)

Therefore, in the serial method, the total number of forward processes can be obtained by expression 4. In the parallel method, the total number of forward processes equals that performed by the serial method as indicated by expression 5 since each forward process is performed independently for each network. In the present invention, since operations of loading a learning pattern to an input layer and, for example, of calculating the output of an intermediate layer unit are performed collectively, the forward process containing the common operations is counted as one process for the whole system, thereby obtaining the total number of forward processes as indicated by expression 6.

FIG. 15 shows a practical example of obtaining the number of forward processes and the total number of forward processes shown in FIGS. 13 and 14. For example, if the numbers of forward processes performed by each of networks A, B, and C are 6, 4, and 11, the number of forward processes and the total number of forward processes in the serial method are both 21, while in the parallel method, they are 11 and 21 respectively. In the present invention, they are both 11. In the present embodiment, since a plurality of networks synchronously perform a learning process and the time taken for performing a forward process and controlling the update of a weight value is constant regardless of the scale of the neural network, the number of learning processes and the learning time corresponds one-to-one to each other.

FIG. 16 shows the difference between the conventional method and the present invention. The total time taken for a learning process equals the sum of learning time spent in each network using the conventional serial method, while in the conventional parallel method and the present invention, the total time equals the maximum value of the learning time performed by the networks. FIGS. 13 and 14 show how to calculate the number of forward processes and the total number of forward processes.

In the comparison of the required amount of the hardware for loading a pattern shown in FIG. 16, the memory is shared for storing the same pattern. The amount of the hardware includes a port of a memory used as a transmission unit for transmitting data from one memory to a plurality of networks, a transmission processor, and buses. While the amount of the hardware required by the serial method and the present invention is only one unit for each of the above described items, that required by the conventional parallel method is a plurality of units equal to the number of networks being used. The variation of patterns learned simultaneously by the conventional parallel method is one or more because a network can be appropriately segmented to provide different patterns. However, in the present invention and the conventional serial method, only one pattern can be learned simultaneously.

As described above, the present invention can reduce the overhead required in loading an input pattern and performing a forward process through a neural network by sharing at least one of the input layer and the intermediate layer in a hierarchical neural network system. Accordingly, it simplifies the hardware structure when configuring the system and realizes a neural network learning system capable of efficiently performing a learning process.

As for the field of applications in industries, the present invention can be used in all fields of industries to recognize a pattern, perform various controls, etc. using a neural network.

What is claimed is:

1. A method of training and operating a neural network system having a plurality of hierarchical neural networks each having at least one intermediate layer and an output layer, comprising the steps of:

(a) providing a common input layer commonly used by the hierarchical neural networks as an input layer;

(b) storing a teaching pattern for the common input layer and the output layer of corresponding neural networks;

(c) processing the teaching pattern in each of the corresponding neural networks to obtain an output pattern from each output layer of the corresponding neural networks;

(d) calculating an error between the output pattern and the teaching pattern in each of the corresponding neural networks;

(e) adjusting weighting values in each of the corresponding neural networks in dependence upon the error calculated in step (d);

(f) storing an input pattern for the common input layer; and (g) selecting at least one of the corresponding neural networks when an operation is performed on the input pattern in the neural network system.

\* \* \* \* \*